US011601396B2

(12) United States Patent
Koskinen et al.

(10) Patent No.: US 11,601,396 B2
(45) Date of Patent: Mar. 7, 2023

(54) TRANSPORTATION INFRASTRUCTURE SERVICE DISCOVERY ARRANGEMENT

(71) Applicant: KONE Corporation, Helsinki (FI)

(72) Inventors: Santtu Koskinen, Helsinki (FI); Mikko Piironen, Helsinki (FI); Anssi Rantamäki, Helsinki (FI); Mikko Heiskanen, Helsinki (FI); Ari Koivisto, Helsinki (FI); Mikko Mattila, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 17/205,500

(22) Filed: Mar. 18, 2021

(65) Prior Publication Data
US 2021/0211406 A1  Jul. 8, 2021

Related U.S. Application Data
(63) Continuation of application No. PCT/FI2018/050745, filed on Oct. 16, 2018.

(51) Int. Cl.
H04L 61/5014 (2022.01)
H04L 61/4511 (2022.01)
H04L 101/69 (2022.01)

(52) U.S. Cl.
CPC ...... *H04L 61/5014* (2022.05); *H04L 61/4511* (2022.05); *H04L 2101/69* (2022.05)

(58) Field of Classification Search
CPC ............ H04L 61/609; H04L 61/1511; H04L 61/2015; H04L 61/5014; H04L 61/4511; H04L 2101/69
See application file for complete search history.

(56) References Cited

U.S. PATENT DOCUMENTS

| 4,512,442 A | * | 4/1985 | Moore ............... B66B 5/0037 187/393 |
| 6,216,172 B1 | | 4/2001 | Kolblin et al. |
| 8,891,423 B2 | | 11/2014 | Shaheen et al. |
| 9,537,808 B1 | * | 1/2017 | Giansiracusa ...... H04L 41/0226 |

(Continued)

FOREIGN PATENT DOCUMENTS

| CN | 103647782 B | 2/2017 |
| EP | 2 258 649 A1 | 12/2010 |

(Continued)

OTHER PUBLICATIONS

CISCO, "Connected Rail Solution Design Guide," URL: https://www.cisco.com/c/dam/en_us/solutions/industries/docs/cts-dg.pdf. Nov. 2016. XP055613499, 42 pages total.

(Continued)

*Primary Examiner* — Joseph L Greene
(74) *Attorney, Agent, or Firm* — Birch, Stewart, Kolasch & Birch, LLP

(57) ABSTRACT

Transportation infrastructure service discovery arrangement disclosed. In the arrangement a peripheral device is attached to a transportation infrastructure control network. The client is configured to request an address from a DNS server of the host network. As a response the client receives network settings that can be used for contacting applications attached to the transportation infrastructure control network.

19 Claims, 3 Drawing Sheets

(56) References Cited

U.S. PATENT DOCUMENTS

| | | | |
|---|---|---|---|
| 9,602,462 B2* | 3/2017 | Yu | H04L 43/045 |
| 2009/0022131 A1 | 1/2009 | Rusanen et al. | |
| 2012/0066356 A1 | 3/2012 | Nguyen et al. | |
| 2012/0145487 A1 | 6/2012 | Yoo | |
| 2014/0045479 A1 | 2/2014 | Shinada et al. | |
| 2016/0337181 A1* | 11/2016 | Cath | H04L 61/1541 |
| 2018/0099840 A1* | 4/2018 | Armistead | B66B 3/008 |
| 2018/0238579 A1* | 8/2018 | Bull | F24F 11/64 |
| 2021/0306254 A1* | 9/2021 | Marrotte | H04L 45/24 |

FOREIGN PATENT DOCUMENTS

| | | |
|---|---|---|
| EP | 2587725 A1 | 5/2013 |
| EP | 3 062 541 A1 | 8/2016 |
| EP | 3 318 523 A1 | 5/2018 |
| EP | 3 381 851 A2 | 10/2018 |
| EP | 3 381 852 A2 | 10/2018 |
| WO | WO 2007/061405 A2 | 5/2007 |
| WO | WO 2007/093665 A1 | 8/2007 |
| WO | WO 2010/087815 A1 | 8/2010 |
| WO | WO 2012/118711 A2 | 9/2012 |
| WO | WO 2014/122357 A1 | 8/2014 |
| WO | WO 2015/084396 A1 | 6/2015 |
| WO | WO 2015/177020 A | 11/2015 |
| WO | WO 2018/050654 A1 | 3/2018 |

OTHER PUBLICATIONS

Cisco, "Understanding CHAP authentication," URL: https://www.cisco.com/c/en/us/support/docs/wan/point-to-point-protocol-ppp/25647-understanding-ppp-chap.pdf, Oct. 21, 2015, XP055600402, 10 pages total.

International Search Report for International Application No. PCT/EP2018/078149, dated Mar. 28, 2019.
International Search Report for International Application No. PCT/FI2018/050742, dated Jul. 18, 2019.
International Search Report for International Application No. PCT/FI2018/050743, dated Jul. 5, 2019.
International Search Report for International Application No. PCT/FI2018/050/44, dated Sep. 4, 2019.
International Search Report for International Application No. PCT/FI2018/050745, dated Jul. 8, 2019.
International Search Report for International Application No. PCT/FI2018/050746, dated Sep. 24, 2019.
International Search Report for International Application No. PCT/FI2018/050747, dated Jul. 8, 2019.
International Search Report for International Application No. PCT/FI2018/050748, dated Jul. 5, 2019.
Written Opinion of the international Searching Authority for international Application No. PCT/EP2018/078149, dated Mar. 28, 2019.
Written Opinion of the International Searching Authority for International Application No. PCT/FI2018/050742, dated Jul. 18, 2019.
Written Opinion of the international Searching Authority for international Application No. PCT/FI2018/050743, dated Jul. 5, 2019.
Written Opinion of the International Searching Authority for International Application No. PCT/FI2018/050744, dated Sep. 4, 2019.
Written Opinion of the International Searching Authority for International Application No. PCT/FI2018/050745, dated Jul. 8, 2019.
Written Opinion of the international Searching Authority for International Application No. PCT/FI2018/050746, dated Sep. 24, 2019.
Written Opinion of the International Searching Authority for International Application No. PCT/FI2018/050747, dated Jul. 8, 2019.
Written Opinion of the international Searching Authority for International Application No. PCT/F12018/050748, dated Jul. 5, 2019.

* cited by examiner

TRANSPORTATION INFRASTRUCTURE SERVICE DISCOVERY ARRANGEMENT

CROSS REFERENCE TO RELATED APPLICATIONS

This application is a Continuation of PCT International Application No. PCT/FI2018/050745, filed on Oct. 16, 2018, which is hereby expressly incorporated by reference into the present application.

DESCRIPTION OF BACKGROUND

The following description relates to elevators and escalators. More particularly the description relates to service discovery for elevators and escalators.

Modern elevators are network connected devices that can be accessing resources from one or more external entities providing services to elevators and escalators for the benefit of passengers. In addition to the improvement of passenger comfort and efficiency, the network connectivity may be used for several other purposes, for example entertainment or data collection.

Nowadays the network connectivity does not only relate to external devices connected to an transportation infrastructure system. Even some components that are relevant or even essential for normal operation of an elevator or escalator group can be connected using data communication networks.

In this description, these components are referred to as applications. The applications may be implemented as hardware or software. Many applications involving hardware also include software, and software applications may be executed in a server or central computing resource. Thus, an application can be described as an entity providing services to requesting clients. An example of an application is a group controller. An example of a client is a destination operating panel installed in an elevator arrangement. Applications and clients can be provided by a third party. Thus, an application could be a music or a video streaming service that is configured to provide content to elevator and escalator passengers.

Current elevators use a network arrangement that is in this description referred to as a transportation infrastructure control network (TICN). A TICN can be a combination of wired and wireless network solutions.

The TICN is used for connecting elevator and escalator components together. Particularly, they are used for connecting Elevator Escalator Peripheral Devices (EEPD) to the elevator arrangement. When new peripheral devices, which are here discussed as an example of client entities, are added to the elevator or escalator arrangement, the peripheral devices must be detected and connected to the network appropriately. The same applies when already existing peripheral devices need to be disconnected and then reconnected to the arrangement. Further needs may arise from other possible reorganizing related tasks.

Even if the TICN is most commonly used for data communications related to elevators and escalators, it can also be used for controlling, for example, access gates, display panels and the like. It is not necessary that the TICN is coupled with elevators and escalators, and the TICN can be used, for example, for access gates only. In this application the TICN is understood to be a separate physical network originally designed for transportation infrastructure purposes only.

In conventional approaches, clients, for example peripheral devices, discover available services using beacon style messaging. Each of the available and active applications connected to the TICN transmit service availability messages. These messages are broadcasted with a constant interval so that when the client is connected to the TICN, it discovers available services by listening to ports that are used for transmitting service availability messages.

The use of beacon style messaging causes unnecessary messaging that requires bandwidth and causes the additional task of generating and broadcasting these messages. Additional messaging may also cause additional data security problems.

SUMMARY

In the following description transportation infrastructure service discovery arrangement disclosed. In the arrangement a peripheral device is attached to a transportation infrastructure control network. The client is configured to request an address from a DNS server of the host network. As a response the client receives network settings that can be used for contacting applications attached to the transportation infrastructure control network.

In an aspect a method for discovering applications in a transportation infrastructure control network is disclosed. The method comprises transmitting a DNS-query; receiving a response to the transmitted DNS-query, wherein the response comprises at least one application address; transmitting a service query to at least one received application address; and receiving a service for the transmitted service query.

A benefit of the aspect is that it facilitates the use of existing networks for elevator and escalator use. This will reduce the number of used network technologies and provides simplicity, which will lead to easier and more cost efficient maintenance. A further benefit in the matter is increased data security and efficiency due to the use of layer 3 networking instead of layer 2 that has been used in conventional solutions involving beacon broadcasts.

In an implementation the method further comprises transmitting a request to a DHCP-server; and receiving a set of network parameters as a response to the transmitted request. It is beneficial that the internet address can be configured dynamically.

In an implementation the method further comprises connecting to at least one application using the received at least one application address. It is beneficial that the queried application may be connected. The purpose of the aspect is to find an available application that can, but must not necessarily be, connected to.

In an implementation the transmitted DNS-query comprises at least one predetermined application name. It is practical to use predetermined names for applications so that they can be queried from a standard DNS-server using a standard query. This means that no special purpose servers are needed.

In an implementation the transmitted DNS-query comprises a special query for receiving addresses for all available applications. It is beneficial to have the flexibility to use special purpose DNS-servers instead of standard DNS-servers. The special purpose functionality may be an additional code that can handle the special purpose queries.

In an implementation the transportation infrastructure control network is formed in an existing building network. It is beneficial to use networks that are already existing in the buildings so that no new networks need to be constructed for the transportation infrastructure control network.

In an aspect a computer program comprising computer executable computer program code is disclosed. The computer program code is configured to perform a method described above when the computer program is executed in a computing device.

In an aspect a transportation infrastructure peripheral device is disclosed. The transportation infrastructure peripheral device comprises at least one processor configured to execute computer program code; at least one memory configured to store computer program code and related data; and at least one network connection configured to connect the transportation infrastructure peripheral device to a data communications network, wherein the transportation infrastructure peripheral device is configured to perform a method as described above.

In an aspect a transportation infrastructure system is disclosed. The transportation infrastructure system comprises at least one transportation infrastructure peripheral device as described above, wherein the peripheral device is configured to transmit queries using a transportation infrastructure control network; at least one DHCP-server connected to the transportation infrastructure control network, wherein the DHCP-server is configured to receive at least one query from a peripheral device and further configured to respond to the received queries, wherein the response comprises at least an internet address for the peripheral device and an internet address for a DNS-server; at least one DNS-server for the transportation infrastructure control network, configured to receive at least one query from the peripheral device and further configured to respond to the received queries, wherein the response comprises at least an internet address for at least one application; and at least one application connected to the transportation infrastructure control network, wherein the application is configured to receive requests from the peripheral device and as a response to perform the requested task.

In an implementation the application is one of the following: an elevator group master service, a site manager service, an authentication service, an audio stream service, a video stream service, a content management system, and a cloud service.

In an implementation the peripheral device is one of the following: a destination operation panel, a speaker, a display, a media screen, a device requiring authentication, an authentication device, a camera, a fingerprint scanner and a biometric scanner.

The benefits of the described aspects include efficient and flexible arrangement for a transportation infrastructure control network. Conventional beacon based networks are not needed, and elevator signaling can be done using level 3 networking instead of conventional level 2 networking.

BRIEF DESCRIPTION OF THE DRAWINGS

The accompanying drawings, which are included to provide a further understanding of the transportation infrastructure service discovery arrangement and constitute a part of this specification, illustrate example embodiments and together with the description help to explain the principles of the transportation infrastructure service discovery arrangement. In the drawings.

DETAILED DESCRIPTION

Reference will now be made in detail to the embodiments, examples of which are illustrated in the accompanying drawings.

In the following description, an elevator is used as an example. The arrangement is also suitable for escalators and systems comprising both elevators and escalators and also to other transportation infrastructure systems, such as access gates, doors and similar.

Figure 1A:
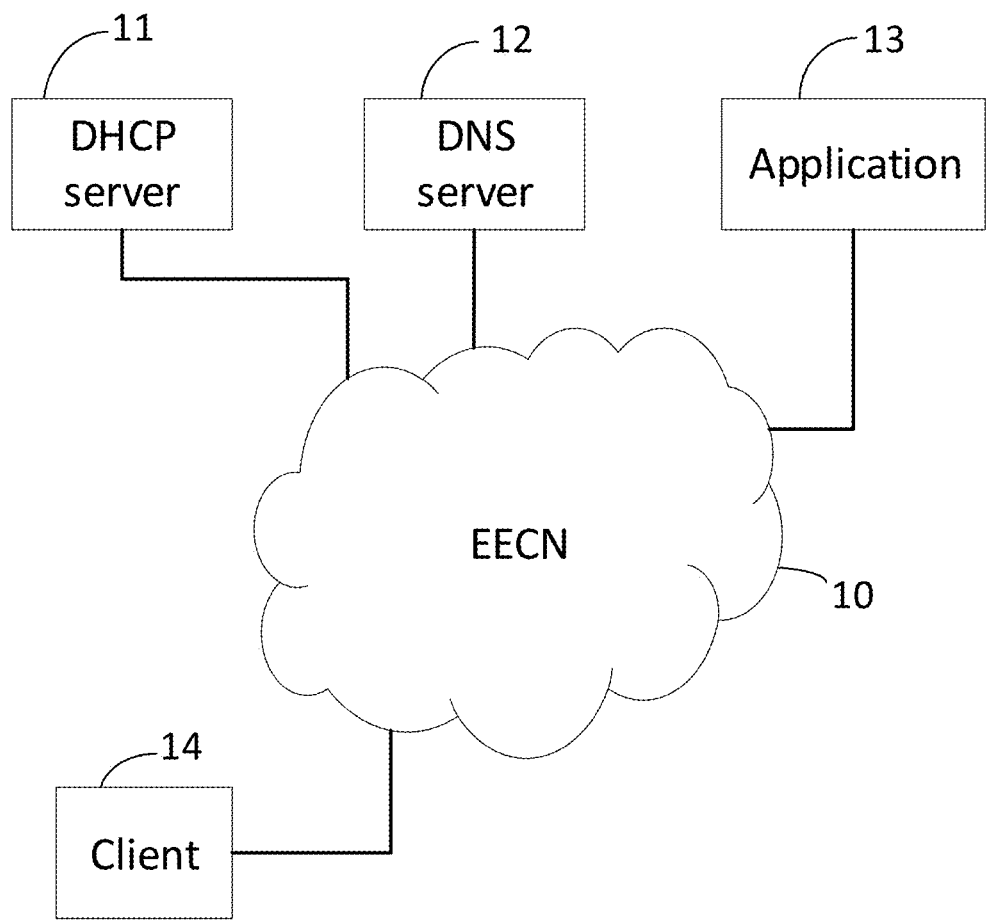
FIG. 1a is a block diagram of an example embodiment of the transportation infrastructure service discovery arrangement.

In FIG. 1a a block diagram of an example embodiment of the transportation infrastructure service discovery arrangement is shown. The example of FIG. 1 is provided for better understanding of the general working environment of the transportation infrastructure service discovery arrangement.

In the system, a transportation infrastructure control network TICN 10 is shown. The TICN is a network capable of connecting various devices together. The connected devices can be computing devices, modern internet connectable devices, internet of things devices or similar devices. The network may be implemented using Ethernet, which is a common network technology. The TICN may be supplemented using other wired or wireless network connections, such as mobile communication networks, wireless local area networks or the like. Typically, the used network technologies are chosen from network technologies that are implemented at the site for other purposes. As Ethernet is currently the dominating technology, in the following description the use of Ethernet is assumed.

In case of Ethernet, the common Ethernet and internet technologies can be used. In FIG. 1 a DHCP server 11 and a DNS server 12 are shown. The DHCP is responsible for dynamic host configuration. Even if dynamic configuration is used in the example of FIG. 1, it is possible to use static configuration of the internet address. When a device is connected to a network, typically a DHCP service is used for acquiring a set of parameters relevant for the connection. Examples of such parameters are the IP address of the connected device and a DNS server address. Although the DHCP protocol is mentioned here as an example, any other suitable host configuration protocol can also be used. The suitable host configuration protocol and associated network elements need to be capable of providing network settings that are required in the used network technology. The network settings may be used for forming a local subnet or they may be public in the internet.

The DNS server 12 is the responsible name service in the TICN 10. Name servers are typically used to translate meaningful human understandable names into numeric addresses used by computers. The name servers can be configured globally or locally. A locally configured DNS server cannot be seen from outside of the network, so that it cannot receive queries from outside and does not exchange local addresses with other name servers. Locally configured DNS-services may also be implemented to act as a proxy so that the local DNS-server stores commonly used addresses and treats local addresses locally. The local treatment of addresses facilitates the use of simple addresses that need not be unique in the internet. Local addresses and names may be used for various reasons, and are typically used when the devices are not commonly used outside the local network or subnet.

In the example of FIG. 1, one client 14 is shown. This client may be a peripheral device, such as a destination operating panel (DOP) used for making elevator calls and connected to the TICN. In the example of FIG. 1, one application 13 is shown. Other examples of clients or peripheral devices include speakers, displays and media screens that are connected to a network. These may need a content management service and may need to locate a server for content and software updates. Furthermore, any devices that require authentication and need to be connected to a network for performing the authentication may be considered clients in the context of this description.

The application may be a group controller or an elevator group master service. The master service can be typically re-located to a different physical unit in case of breakdown or communication error. Other examples of applications include a site manager service that runs several system level functions and services that are necessary for the operation of the network. Further applications include servers for different authentications and other devices providing services for peripheral devices.

In the example above the TICN is formed using common Ethernet. The Ethernet-based network used may be dedicated or shared with other arrangements. A common approach is to use already existing networking arrangements, so that the network is shared with all users and the building comprises only one network using the same cables and network elements. In such a case the TICN may be logically formed and carried by the building network. The TICN may be logically separated and use own or shared network elements; however, typically when a peripheral device is connected to the TICN, it first connects with the building network and uses network elements belonging to the building network.

Figure 1B:
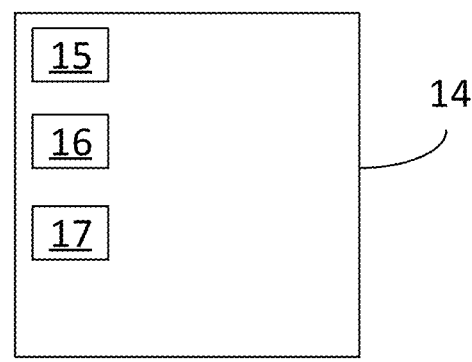
FIG. 1b is a block diagram of a client, which is an example of a transportation infrastructure peripheral device.

In FIG. 1b an example of a client device, which is a transportation infrastructure peripheral device, is illustrated. The client device 14 comprises at least one processor 15 configured to execute computer program code. The processors may be general or special purpose processors. The device further comprises at least one memory 16 configured to store computer program code and related data. The memory may be one particular memory or several different memories of different types, such as conventional random access memory, flash memory, hard drives and the like. The client device further comprises at least one network connection 17 configured to connect the transportation infrastructure peripheral device to a data communications network. In the example it is assumed that the network is Ethernet; however, as explained above, also other technologies may be used.

Figure 2:
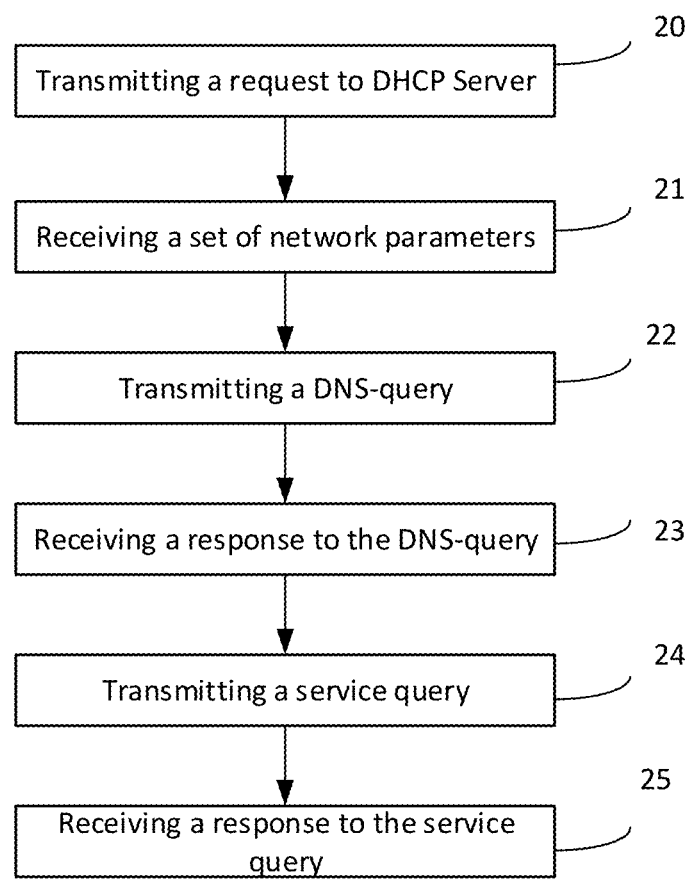
FIG. 2 is a flow chart of an example method of the present transportation infrastructure service discovery arrangement.
Figure 3:
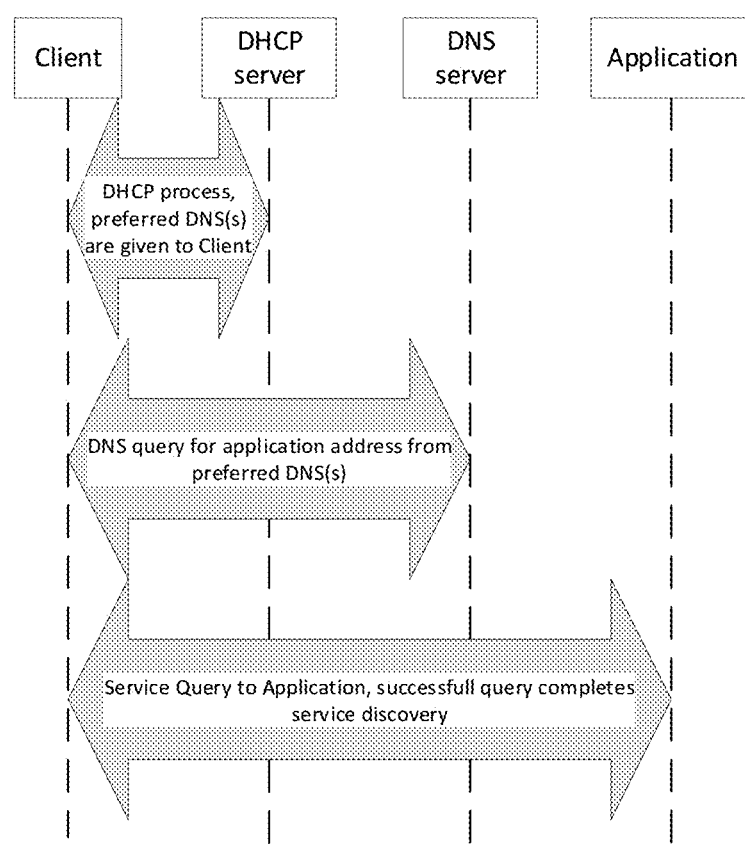
FIG. 3 is an example of a signaling chart of transportation infrastructure service discovery arrangement.

In FIG. 2 an example of a method according to the transportation infrastructure service discovery arrangement is shown. The method is initiated by connecting a client device, such as a transportation infrastructure peripheral device, to a TICN network, and the connected device transmits a request to a DHCP-server, step 20. As a response to the request the client device receives a set of network parameters, step 21. Examples of these parameters include, for example, an internet address, a DNS-server address and other parameters that are relevant for communicating with intended devices. The addresses, both of the internet address of the device and the address of the DNS-server, may be local or global. Thus, it is possible to set the network so that the client device and/or the DNS-server cannot be accessed outside of the TICN; however, they may also be connected to a public network. In that case the devices are typically protected by virtual private networks or similar security arrangements, so that unauthorized persons or devices cannot connect with the client devices, applications and other servers included in the TICN.

When the address of at least one DNS-server is known, a DNS-query can be transmitted, step 22. The DNS-query may be a standard DNS-query, which comprises an internet domain name to be resolved. Optionally the DNS-server may have an additional feature of the query returning a list of addresses instead of one address, so that the querying device receives an address for every application in the TICN, step 23. This step may also be implemented such that the DNS returns an address for an additional component from which the application addresses are then queried. This facilitates the possibility to use the standard DNS functionality without a need to change the DNS-server being used.

After one or more addresses for the applications are received, the client device may send one or more service queries, step 24. Steps 20-23 can be considered as an initialization phase, and after the initialization, the service queries are sent when necessary. For each service query the client device receives a response, step 25. The response may be a confirmation that the requested service has been performed, for example by instructing another device to do something, or the client device may receive a data set as a response and process the data further.

The above mentioned method may be implemented as computer software which is executed in a computing device that can be connected to the network used for carrying the TICN. When the software is executed in a computing device it is configured to perform the above described inventive method. The software is embodied on a computer readable medium, so that it can be provided to the computing device, such as the client 14 of FIG. 1.

As stated above, the components of the exemplary embodiments can include a computer readable medium or memories for holding instructions programmed according to the teachings of the present embodiments and for holding data structures, tables, records, and/or other data described herein. The computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the transportation infrastructure service discovery arrangement may be implemented in various ways. The transportation infrastructure service discovery arrangement and its embodiments are thus not limited to the examples described above; instead they may vary within the scope of the claims.

The invention claimed is:

1. A method for discovering applications in a transportation infrastructure control network connecting transportation infrastructure peripheral devices to an elevator or escalator arrangement, which method comprises:

connecting a transportation infrastructure peripheral device to the transportation infrastructure control network;

transmitting a DNS-query;

receiving a response to the transmitted DNS-query, wherein the response comprises an address for each of the applications in the transportation infrastructure control network, the applications include at least one of an elevator group master service, a site manager serves that runs several system level functions and services that are necessary for operations of the transportation infrastructure control network and serves for authentications and providing services for the transportation infrastructure peripheral devices;

transmitting a service query to at least one received application address;

receiving a response by the transportation infrastructure peripheral device in response to the transmitted service query, said response being a confirmation that the requested service has been performed, and receiving a service for the transmitted service query, wherein the response to the transmitted DNS-query further includes an address for an additional component from which the application addresses are queried.

2. The method according to claim 1, wherein the method further comprises:

transmitting a request to a DHCP-server; and receiving a set of network parameters as a response to the transmitted request.

3. The method according to claim 1, wherein the method further comprises connecting to at least one application using the at least one received application address.

4. The method according to claim 1, wherein the transmitted DNS-query comprises at least one predetermined application name.

5. The method according to claim 1, wherein the transportation infrastructure control network is formed in an existing building network.

6. A computer program embodied on a non-transitory computer readable medium and comprising computer executable computer program code, wherein the computer program code is configured to perform the method according to claim 1 when the computer program is executed in a computing device.

7. A transportation infrastructure peripheral device comprising:

at least one processor configured to execute computer program code;

at least one memory configured to store computer program code and related data; and at least one network connection configured to connect the transportation infrastructure peripheral device to a data communications network, wherein the transportation infrastructure peripheral device is configured to perform the method according to claim 1.

8. A transportation infrastructure system comprising:

at least one transportation infrastructure peripheral device according to claim 7, wherein the peripheral device is configured to transmit queries using a transportation infrastructure control network;

at least one DNS-server for the transportation infrastructure control network, configured to receive at least one query from the peripheral device and further configured to respond to the received queries, wherein the response comprises at least an internet address for at least one application; and at least one application connected to the transportation infrastructure control network, wherein the application is configured to receive requests from the peripheral device and as a response to perform the requested task.

9. The transportation infrastructure system according to claim 8, wherein the transportation infrastructure system further comprises at least one DHCP-server connected to the transportation infrastructure control network, wherein the DHCP-server is configured to receive at least one query from a peripheral device and further configured to respond to the received queries, and wherein the response comprises at least an internet address for the peripheral device and an internet address for a DNS-server.

10. The system according to claim 8, wherein the application is one of the following: an elevator group master service, a site manager service an authentication service, an audio stream service, a video stream service, a content management system, and a cloud service.

11. The system according to claim 8, wherein the peripheral device is one of the following: a destination operation panel, a speaker, a display, a media screen, a device requiring authentication, an authentication device, a camera, a fingerprint scanner and a biometric scanner.

12. The method according to claim 2, wherein the method further comprises: connecting to at least one application using the at least one received application address.

13. The method according to claim 2, wherein the transmitted DNS-query comprises at least one predetermined application name.

14. The method according to claim 3, wherein the transmitted DNS-query comprises at least one predetermined application name.

15. The method according to claim 2, wherein the transmitted DNS-query comprises a special query for receiving addresses for all available applications.

16. The method according to claim 3, wherein the transmitted DNS-query comprises a special query for receiving addresses for all available applications.

17. The method according to claim 2, wherein the transportation infrastructure control network is formed in an existing building network.

18. The method according to claim 3, wherein the transportation infrastructure control network is formed in an existing building network.

19. The system according to claim 1, wherein the application is one of the following: an elevator group master service, a site manager service an authentication service, an audio stream service, a video stream service and a content management system, and wherein the peripheral device is one of the following: a destination operation panel, a speaker, a display, a media screen, a device requiring authentication, an authentication device, a camera, a fingerprint scanner and a biometric scanner.

* * * * *